US007590593B2

(12) United States Patent
Madoff et al.

(10) Patent No.: US 7,590,593 B2
(45) Date of Patent: *Sep. 15, 2009

(54) AUCTION MARKET WITH PRICE IMPROVEMENT MECHANISM

(75) Inventors: Peter B. Madoff, Old Westbury, NY (US); Alberto C. Casanova, Juno Beach, FL (US); Christopher Keith, New York, NY (US)

(73) Assignee: Primex Holdings LLC, New York, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/649,432

(22) Filed: Jan. 4, 2007

(65) Prior Publication Data

US 2008/0126237 A1   May 29, 2008

Related U.S. Application Data

(63) Continuation of application No. 10/242,532, filed on Sep. 12, 2002, now Pat. No. 7,162,448, which is a continuation of application No. 09/272,542, filed on Mar. 19, 1999.

(51) Int. Cl.
*G06Q 40/00* (2006.01)
(52) U.S. Cl. .......................................... 705/37; 705/35
(58) Field of Classification Search .................... 705/35
See application file for complete search history.

(56) References Cited

U.S. PATENT DOCUMENTS 5,136,501 A * 8/1992 Silverman et al. ............. 705/37
5,689,652 A * 11/1997 Lupien et al. ................. 705/37
5,809,483 A * 9/1998 Broka et al. ................... 705/37

OTHER PUBLICATIONS

Brooks, "Instinet Corporation", SEC-No Action Letter, Fed. Sec. L. Rep. P 78,997, 1986 WL 67657, pp. 1-27.
Wunsch, "Arizona Stock Exchange", SEC-No Action Letter, 1997 WL 11862, pp. 1-12.
SEC Release No. 34-36367, "Self-Regulatory Organization: Delta Government Options Corp.; Order Approving Implementation of New Procedures for the Clearance and Settlement of Repurchase Transactions and Reverse Repurchase Transactions", 60 SEC-Docket 1216-2, Oct. 13, 1995.

(Continued)

*Primary Examiner*—Kambiz Abdi
*Assistant Examiner*—Kito R Robinson
(74) *Attorney, Agent, or Firm*—Baker & Hostetler LLP

(57) ABSTRACT

A system for auctioning financial products over a distributed, networked computer system includes a plurality of workstations for entering orders for financial products into the distributed, networked computer system. The orders specify a price for the financial product, a quantity of the financial product and exposure time which the order can remain active. The system also includes a plurality of workstations for entering predefined relative indication and responses to orders for the product. The predefined relative indications specify a willingness to trade. The responses specify a price and quantity. The system includes a server computer coupled to the workstations for entering the orders, predefined relative indications, and the responses, with the server computer executing a server process that for a first one of said orders, determines a match to said first order with the predefined relative indications, responses and contra-side orders during an interval determined by the exposure time specified by said first order.

71 Claims, 14 Drawing Sheets

OTHER PUBLICATIONS

SEC Release No. 34-27611, "Self-Regulatory Organization: Delta Government Options Corp.; Order Granting Temporary Registration as a Clearing Agency", 45 SEC-Docket 388-263, Jan. 12, 1990.

SEC Release No. 34-28899, "Self-Regulatory Organizations; Wunsch Auction Systems, Inc.; Order Granting Limited Volume Exemption from Registration as an Exchange under Section 5 of the Securities Exchange Act", 48 SEC Docket 402-152, Feb. 20, 1991.

Klein, "B&K Securities, Inc. Inquiry Letter", NO-ACT, NAFT WSB File No. 042285012, Apr. 16, 1985.

Slevin, "93-94 CCH Dec., FSLR ¶76,837, Cantor Fitzgerald, G.P. Inquiry Letter", NO-ACT, NAFT WSB File No. 032194021, Oct. 1, 1993.

Olberg, "CapitaLink Securities Corp. Inquiry Letter", NO-ACT, NAFT WSB File No. 100686002, Sep. 30, 1986.

Olberg, "CapitaLink Securities Corp. Inquiry Letter 1 and Inquiry Letter 2", NO-ACT NAFT WSB File No. 041690014, Apr. 10, 1990.

Fondren, "Intervest Financial Services, Inc. Inquiry Letter", NO-ACT NAFT WSB File No. 112392013, Nov. 25, 1992.

Branch, "Exchange Services, Inc. Inquiry Letter", NO-ACT NAFT WSB File No. 081285010, Jun. 22, 1985.

Branch, "91 CCH Dec., FSLR ¶79,804, Exchange Services, Inc. Inquiry Letter", NO-ACT, NAFT WSB File No. 090991011, Sep. 11, 1991.

Hood, "91-92 CCH Dec., FSLR ¶76,093, Instinet Corp. Inquiry Letter", NO-ACT, NAFT WSB File No. 120991004, Dec. 6, 1991.

Feller, "91-92 CCH Dec., FSLR ¶76,097, Jefferies & Co., Inc. Inquiry Letter", NO-ACT, NAFT WSB File No. 010692003, Dec. 31, 1991.

Feller, "93 CCH Dec., FSLR ¶76,718, Lattice Trading, Inc. Inquiry Letter", NO-ACT, NAFT WSB File No. 091393002, Sep. 10, 1993.

Brooks, "91-92 CCH Dec., FSLR ¶76,092, Fagin, Kopley & Hanson, Inc. Staff Reply Letter", NO-ACT, NAFT WSB File No. 112591019, Nov. 25, 1991.

Glenn, "Nat'l. Partnership Exchange, Inc. Inquiry Letter", NO-ACT, NAFT WSB File No. 081886013, Aug. 13, 1986.

Simon, "85-86 CCH Dec., FSLR ¶78,161, Nat'l Partnership Exchange, Inc. Staff Reply Letter", NO-ACT, NAFT WSB File No. 090985009, Sep. 1, 1985.

Weissler, "New York Securities Auction Corp. Inquiry Letter", NO-ACT, NAFT WSB File No. 062590005, Jun. 15, 1990.

Feller, "87-88 CCH Dec., FSLR ¶78,515, Jefferies & Co., Inc. Inquiry Letter", NO-ACT, NAFT, WSB File No. 080387006, Jul. 28, 1987.

McTamaney, "RMJ Securities Corp. Inquiry Letter", NO-ACT, NAFT WSB File No. 011789008, Jan. 12, 1989.

Roiter, "Security Pacific Nat'l. Bank Inquiry Letter", NO-ACT, NAFT WSB File No. 081985007, Aug. 18, 1985.

Roiter, "Security Pacific Nat'l. Bank Inquiry Letter", NO-ACT, NAFT WSB File No. 082586014, Aug. 19, 1986.

Tario et al., "Transaction Services Inquiry Letter and Staff Reply Letter", NO-ACT, NAFT WSB File No. 061785011, Jun. 15, 1985.

Hewitt, "Troster Singer Corp. Inquiry Letter and Staff Reply Letter", NO-ACT, NAFT WSB File No. 081285011, Jun. 23, 1985.

United States Securities and Exchange Commission, Division of Market Regulation, "Market 2000: An Examination of Current Equity Market Developments—Appendix IV: Description of Proprietary Trading Systems", Jan. 1994.

\* cited by examiner

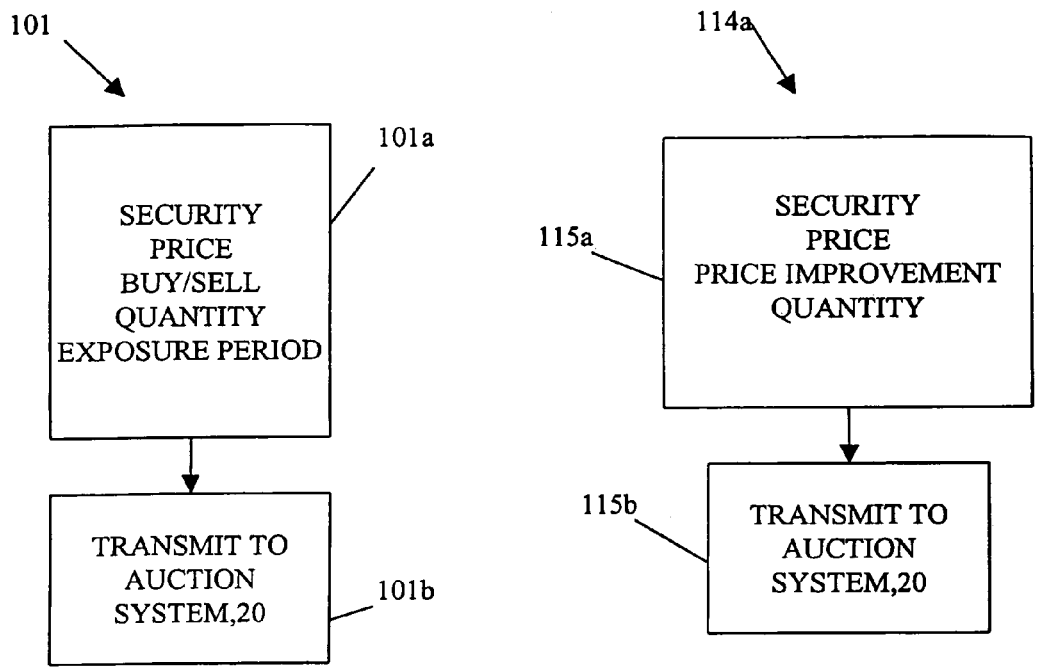
FIG. 9A
FIG. 9B
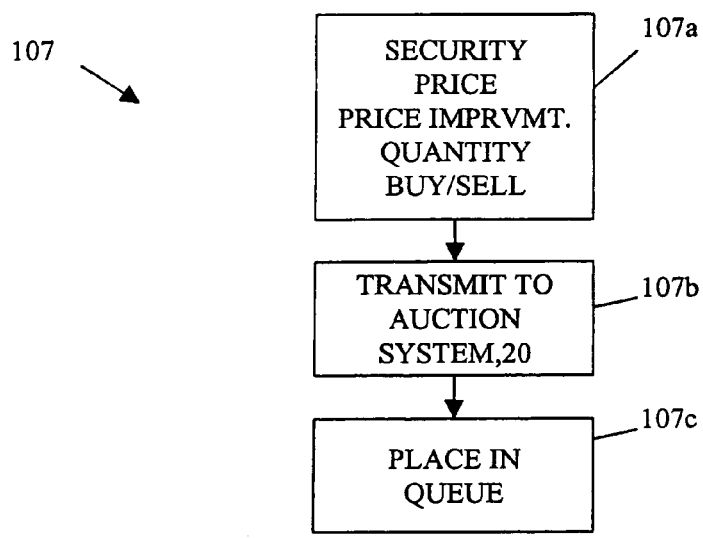
FIG. 9C

AUCTION MARKET WITH PRICE IMPROVEMENT MECHANISM

This is a continuation of and claims priority under 35 U.S.C. §120 to U.S. application Ser. No. 10/242,532, filed Sep. 12, 2002 now U.S. Pat. No. 7,162,448, entitled "Auction Market With Price Improvement Mechanism," which is a continuation application of Ser. No. 09/272,542, filed Mar. 19, 1999, entitled "Auction Market With Price Improvement Mechanism."

BACKGROUND

This invention relates to an automated auction system for trading products such as equity securities.

There are known auction processes. One type of auction process is a live auction used to trade antiques or paintings, for example. Other auctions include live auction processes for financial instruments such as, for example, futures contacts, and for equities in a stock exchange. Examples of live auction processes for stocks include the New York Stock Exchange® (NYSE) or the American Stock Exchange® (AMEX).

On the NYSE and AMEX, for example, orders to buy and sell generally are not executed with an automated process. Instead, a person called a "specialist" stands in front of a crowd, taking orders from the crowd and tries to match the orders with other participants in the crowd, his own account, or sends them to other market centers. While many of the tools a specialist uses to receive orders and record and report final trades are automated, the executions themselves, including the decisions and processes to execute, are overseen in a manual manner. This is in contrast to automated markets, such as the Nasdaq Stock Market, where executions often take place without human intervention. The Nasdaq Stock Market® is an example of an electronic negotiated market involving dealers that negotiate a trade for a security for their own account or for that of a client. Transaction recording and reporting in the NYSE and AMEX exchanges and The Nasdaq Stock Market are generally automated.

Other types of auctions are so called "call" or "periodic" auctions such as the Arizona Stock Exchange and the OptiMark™ trading system. In these types of auctions, orders are matched only at specified times during the day.

SUMMARY

According to an aspect of the invention, a method of auctioning products over a distributed networked computer system is provided. The method is executed over the system and includes entering an order for a product. The order can specify a price. The price can be a fixed price, a relative price or a market price. The order also specifies a quantity and an exposure time. The process also includes entering a response to an order, the response specifying a price, price improvement, and quantity and matching the order with the response in accordance with the exposure time specified by the order.

According to an additional aspect of the invention, a method can include entering pre-defined relative indications that correspond to a willingness to buy or sell the product and wherein the pre-defined relative indications specify a price relative to a current market price.

According to an additional aspect of the invention, a method of auctioning financial products over a distributed, networked computer system includes entering orders for financial products into the distributed, networked computer system, said orders specifying a price for the financial product, a quantity of the financial product and exposure time which the order can remain active and entering responses to orders for the product, said responses specifying a price and quantity. For a first one of the orders, matching said first order to the responses and contra-side orders, during an interval determined by the exposure time specified by said first order, and expiring the first one of the orders if no matching responses or others of said orders are received during the exposure period.

According to an additional aspect of the invention, a computer program product for auctioning products, the computer program product residing on a computer readable medium comprising instructions for causing a computer to receive an order that was entered for a product, the order specifying price, quantity and exposure time and receive a response that was entered in response to an order, the response specifying a price, price improvement, and quantity. The program also includes instructions to match the order with the response during the exposure time specified by the order.

According to an additional aspect of the invention, a system for auctioning financial products over a distributed, networked computer system includes a plurality of workstations for entering orders for financial products into the distributed, networked computer system. The orders specify a price for the financial product, a quantity of the financial product and exposure time which the order can remain active. The system also includes a plurality of workstations for entering responses to orders for the product. The responses specify a price and quantity. The system includes a server computer coupled to the workstations for entering the orders and the responses, with the server computer executing a server process that, for a first one of said orders, determines a match to said first order with the responses and others of said orders during an interval determined by the exposure time specified by said first order.

One or more of the following advantages may be provided by aspects of the invention. The auction process is active when an order is presented to the system. Thus, unlike the auction markets with physical trading floors and crowds, the auction process and system of the present invention provides complete automation for both access and execution for transactions. An auction is available anytime an order arrives in the system. The order can be immediately matched with a contra side order if available, instead of having to wait until a specified time of day or interval to elapse.

Entries to match against an order in the auction system can include fixed price, relative price and predefined relative indications. Responses which are entered in response to entry of an order can have a lifespan but preferably responses have no lifespan, that is, they are either immediately matched or canceled.

The entity entering the responses can choose what types of orders to respond to. For example, there are two broad types of orders, public agency orders, e.g., a retail customer, or institutional customer and professional orders, e.g. professional traders or broker dealers trading for their own account. There are corresponding types of responses, public responses and professional responses. Often persons who enter public responses may not want to deal with professional traders since the professional traders may have more knowledge concerning order flow, volume and so forth. This system allows them to select the type of order to respond to.

The auction system permits the use of pre-defined relative indications. A pre-defined relative indication, therefore, is a willingness or an expression to trade that resides in the system and remains dormant and unseen by other participants. This mechanism also allows trading interest to remain anonymous as to price, size and identity. A pre-defined relative indication, when activated, becomes a response that is priced relative to a standard reference quote, e.g., the National Best Bid/offer (NBBO).

BRIEF DESCRIPTION OF THE DRAWINGS

FIGS. 9A-9C are flow charts showing entry formats for orders, responses and pre-defined relative indications.

DESCRIPTION

Figure 1:
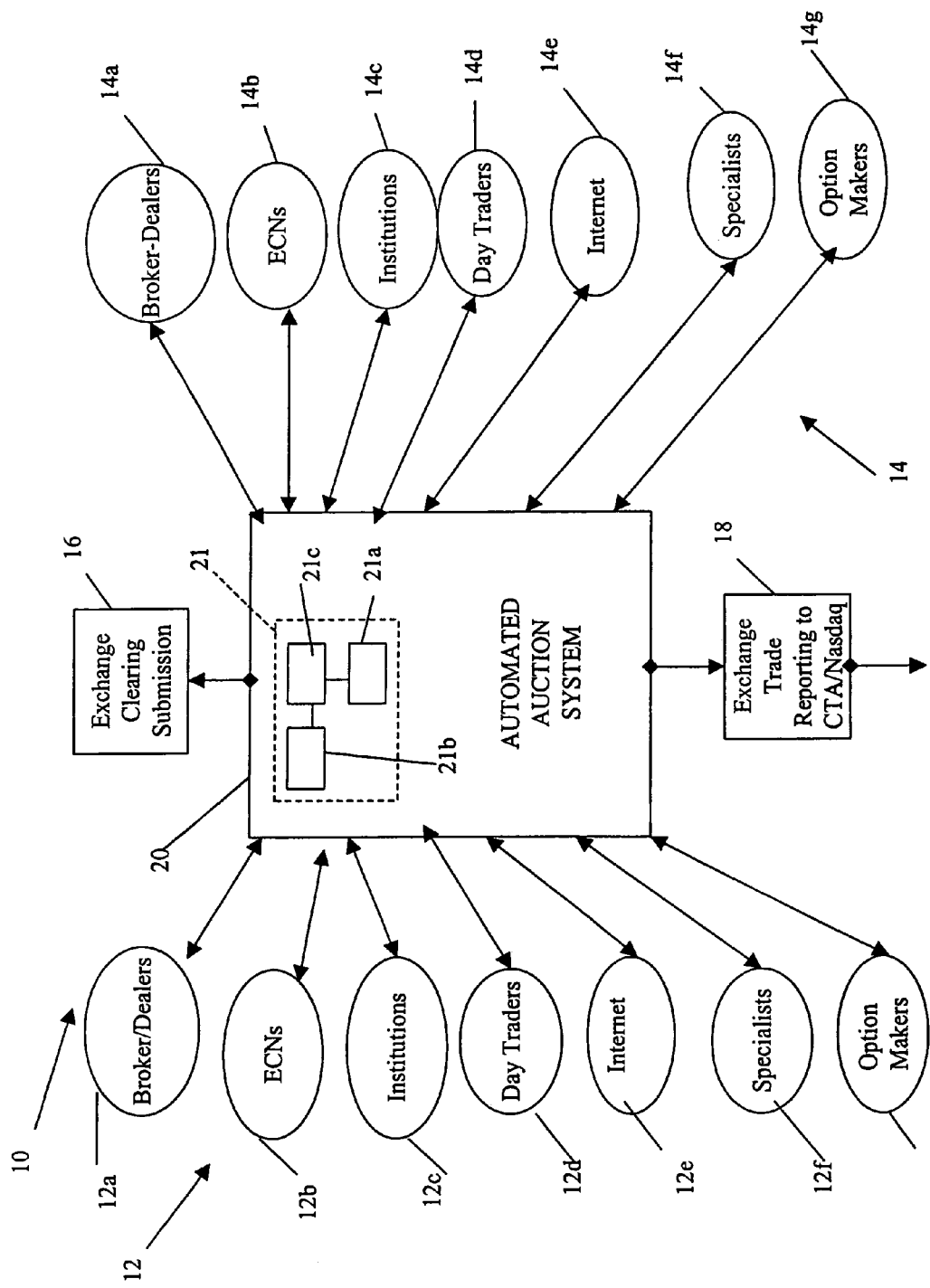
FIG. 1 is a block diagram of an auction system.

Referring now to FIG. 1, a networked auction system 10 designed to facilitate trading of products such as real property, personal property, and financial property such as equity securities and/or other financial instruments such as bonds, options, futures, and so forth is shown. The networked auction system 10 will be described in terms of a system and process in which financial instruments such as stocks are auctioned. Any product could be auctioned particularly if the product has a value or price that can vary over short periods of time.

The networked auction system 10 includes an order entry side 12 comprised of any/all of broker/dealer systems 12a, electronic communication network (ECN) systems 12b and public participant systems 12c that enable members of the public to participate in the networked auction system 10 either directly, via the Internet, or indirectly, via the Internet or another communication medium, through a sponsor such as a broker/dealer. Each of the systems 12 allow the various participants to enter orders into an automated auction system 20. The order entry portion 12 of the networked auction system 10 can also include day trader systems 12d, institutional systems 12e, exchange specialists 12f, and option market makers 12g.

The networked auction system 10 also includes an order response side 14. The order response side 14 can include the same participants including broker/dealer systems 14a, ECN systems 14b, Internet based participant systems 14c, either direct or sponsored, day trader systems 14d and institutional systems 14e and exchange specialists 14f, and option market makers 14g. The responders can use the same physical system as is used to enter orders except the responders would use an order response process. These systems 14 may be referred to herein as the "crowd." With these order response systems 14, when an order is presented, via the order entry systems 12a-12g, any one or more of the order response systems 14a-14g can respond to the order. Whichever order response system 14 responds first to the order and meets or exceeds the terms of the order will result in a match for execution. The response systems 14a-14g can also enter pre-defined relative indications (described below) that express a participant's willingness to trade. Each of the order entry systems 12a-12g and order response systems 14a-14g are representative of types of trader systems and, in fact, in any practical example of such a system, there could be many hundreds, thousands, etc. of any one type or other types of order entry and order response systems.

The order entry systems 12 or the order response systems 14 can be workstations. The workstations can have an interface to communicate with the automated-auction system 20. Alternatively, the workstations can have an application program interface that is developed to interface with the automated auction system 20 or the Financial Information Exchange protocol customized to the auction system 20.

The automated auction system 20 includes at least one server system 21 including a process 21a that is coupled to the order systems 12 and response systems 14 via a network (not shown) parts of which can be proprietary networks and parts of which can be the Internet. The server system 21 executes a server process 100 (FIGS. 10A-10C) that is stored on a storage medium 21b and which is executed in computer main memory 216 that is part of the server 21. The auction system 20 also is coupled to an exchange clearing submission system 16 and an exchange trade reporting system 18. The automated auction system 20 submits exchange clearing submissions to the clearing system 16 and reports execution of trades to the reporting system 18. Trade reporting is accomplished for every execution, (e.g. within 90 seconds of the execution of the trade), so that the trade can be reported for dissemination to vendors of market news, i.e., news outlets, and so forth. The reporting system 18 is a Securities and Exchange Commission (SEC) or other regulatory approved or authorized process through which all trade reports in public securities are disseminated, i.e., the Consolidated Tape Association (CTA) for exchange-listed stocks, and through the NASD/Nasdaq for Nasdaq-listed stocks.

The automated auction system 20 can be a facility of a stock exchange, a market or a self regulatory organization (SRO). As a facility of an SRO which may include an exchange or market, every trade that is executed in the automated auction system 20 is given to the SRO so that the SRO can report the trade and perform other regulatory and clerical operations.

The automated auction system 20 matches orders with responses, other orders, and pre-defined relative indications of willingness to trade. Once an order is matched to a response, another order, or pre-defined relative indication, the match is considered a preliminary execution in the automated auction system 20. The preliminary execution is given to the market or exchange, as appropriate, so that the preliminary execution can be validated. If the preliminary execution is a good execution, it is validated and forwarded to a clearing corporation for clearance and settlement. For example, the exchange can validate that it is a good execution, consistent with the rules of the SRO and the Securities Exchange Commission (SEC) or equivalent regulatory authority and that there are no existing orders that could have been executed or that none of the parties are suspended from trading, and so forth. The exchange trade clearing 16 and reporting 18 are, in general, conventional, the manner that the automated auction system 20 would interface to the exchange trade clearing 16 and reporting 18 could be specified by the those systems.

Each order in the automated auction system 20 has a life span. The maximum life span of an order is determined by the order entry side 14 of the auction 10. The life span can be variable and can be any set time period. Fixed time periods are preferred for trading financial securities such as stocks. Exemplary fixed time periods are a 15 second order, a 30 second order or a 0 second order. The fixed time periods can be chosen taking into consideration the nature of the product that is being traded, any regulatory rules that are imposed on trading the product, as well as, the nature of the market activity. For a financial instrument such as stocks, regulatory rules are generally very important in determining time periods. Other times may be used even for financial instruments based on changes in regulatory rules. At the instant of order entry, an order is exposed to the crowd for the exposure time specified in the order. However, an execution can always end the auction sooner, as will be described below.

Aspects of the auction system rely upon relative prices. These prices are relative to a standard, variable market price. One standard pricing mechanism used in the auction system 10 when auctioning stocks is The National Best Bid/offer (NBBO). The NBBO is a standardized quote in the securities industry for the national market systems best consolidated quotation. The National Best Bid/Offer is a quantifiable price to buy and sell. The NBBO is always changing and could change during the life of an order having an impact on the final price. The relative pricing mechanism uses the NBBO and a price improvement "pi" to produce relative prices. The "pi" enables an order to achieve the best price in the market at the current time. The provision of the price improvement relative to the NBBO or other standard market quote would tend to improve the execution price relative to the spread, i.e., the difference between bid and offer prices for any product or security. It also facilitates decimal denominated trading by enabling small price improvements of one (1) cent or even less.

Figure 2:
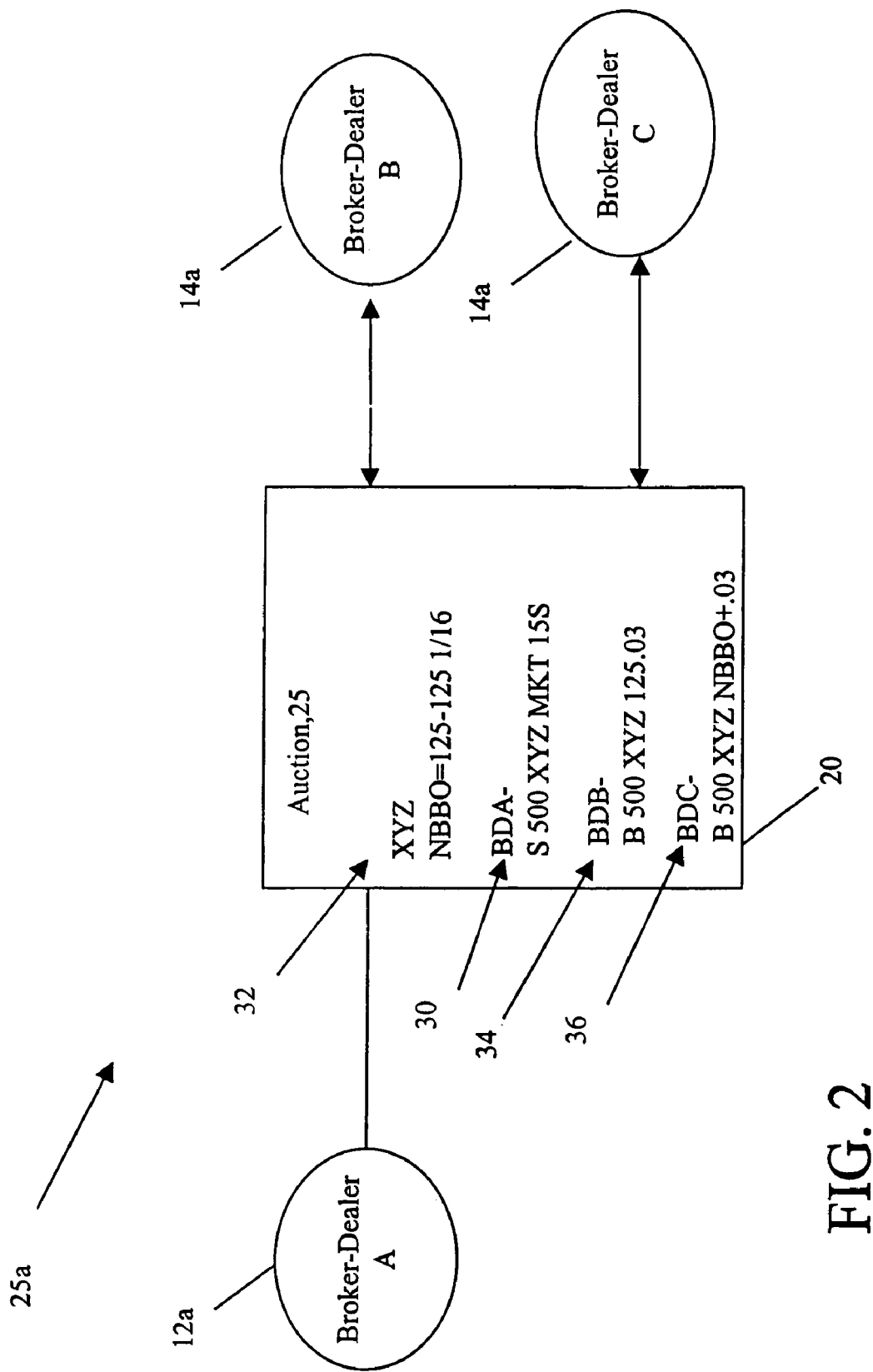
FIGS. 2-8 are block diagrams of auction examples.

Referring now to FIG. 2, an auction example 25a is shown. An order entry participant 12 (FIG. 1), e.g., a broker/dealer system 12a, for example, enters a customer order 30 to sell a certain number of shares, e.g., 500 shares of "XYZ" stock at the market. The order 30 is entered with an order type i.e., buy (B) or sell (S), the number of shares, name of security and an exposure time, e.g., 15 seconds and optional conditions. The National Best Bid Offer 32 (NBBO) is received by the automated auction system 20 for a price 125-125 1/16. The National Best Bid Offer price at this time is only a starting reference price for the auction. In this example, the auction has a maximum life span of 15 seconds. The entry of the order 30 starts the auction. The auction ends, as soon as some response that meets the minimum qualifications of the order is received provided that the order is still actively exposed to the crowd.

Responses in the auction system 20 can include fixed price, relative price and predefined relative indications. Responses can have a lifespan, but preferably responses have no lifespan. That is, they are either immediately matched or canceled. The responses can be permitted to choose what types of orders they respond to. For example, there are two broad types of orders, public agency orders, e.g., a retail customer, or institutional customer. The second type is professional orders, e.g., professional traders or broker dealers trading for their own account.

In the example of FIG. 2, if broker/dealer B enters via a system 14a with a buy response 34 of a fixed variety, at 125.03 for 500 shares of "XYZ" and thereafter but within the exposure time, broker/dealer C enters, via another system 14a, a buy response 36 of a relative variety, at an NBBO+0.03 for 500 shares (which is 125 the NBB+$0.03 a price improvement), the automated auction system 20 will execute the order between broker/dealer A and broker/dealer B since broker/dealer B's order met the qualifications of the auction and it arrived first. This example illustrates that if there are two responses to an order at the same effective price (i.e., either fixed as was response 34 or relative to the NBBO, as was response 36) the response first in time will be executed. In this example, the second response of broker/dealer C is not matched with the order for execution even if it was at a higher price, because the first response of broker/dealer C arrived first and satisfied the order in its entirety.

If there was a portion of the order left over, that is, the first broker/dealer's response 34 was for less than the initial order, then the second broker/dealer's response 36 would have a chance at any remainder. In that case, they could both execute. If, for a customer order to sell 800 shares of "XYZ" (not shown), broker/dealer B's response 34 to buy would result in a trade for 500 shares at broker/dealer B's price and broker/dealer C's response 36 would result in the remaining 300 shares at broker/dealer C's price which may be different.

As soon as the terms and conditions are fully met by a response, that response ends the auction. The automated auction system 20 is active for a maximum time of either the 15 seconds or 30 seconds that was chosen at the time of order entry. The automated auction system 20 also ends the auction for an order, if there were no pre-defined indications and no response that satisfied the order and any conditions attached to the order and chosen exposure time. Thereafter, if the order is not executed in the automated auction system 20, the order may be eligible for a market maker guarantee or sent for execution outside of the system. For example, the order may be entitled either a guarantee or execution elsewhere, as will be described below. The automated auction system 20 will forward the executions to the exchange for validation, trade reporting and clearance.

Figure 3:
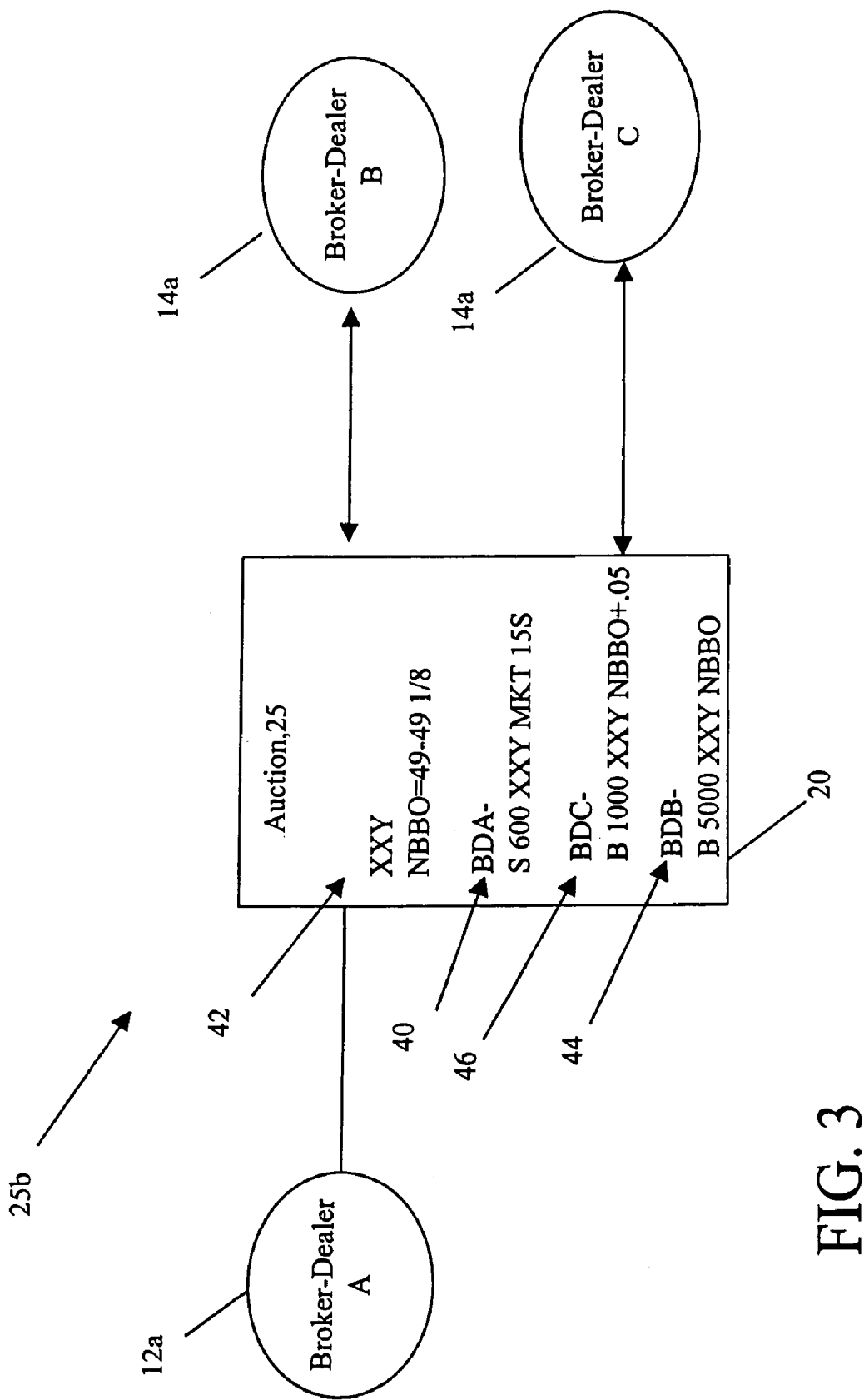

Referring now to FIG. 3, a second auction example 25b is shown. In this example, a customer order 40 is entered for 600 shares of "XXY" to sell at the market, i.e., at the National Best Bid Offer NBBO 42 at the time of the order execution. The exposure time is 15 seconds. This example is illustrative of order entry where there are two pre-defined, relative indications.

In this auction example 25b, the customer order 40 will accept whatever the best bid is at the time the order 40 is entered. The customer places a 15 second lifetime on the order 40. Assume that the NBBO price 42 at the time the order is entered is 49-49⅛, and that broker/dealer B and broker/dealer C had previously entered pre-defined relative indications to buy, 44, 46, respectively. These pre-defined relative indications 44, 46 are responses that are entered into the auction system 20 prior to entry of an order. They are relative, meaning that they are relative to what the NBBO is at the moment they can be matched with an order. A ranking process 105 that prioritizes received pre-defined relative indications by price improvement and time is described in FIG. 11.

In this example, broker/dealer B and broker/dealer C each have pre-defined relative indications which indicate that each would be willing to participate, as in the auction system 20, to an order which is presented at the relative price of the National Best Bid Offer and optionally some price improvement. Since the customer is a seller, the relative price is the National Best Bid (NBB) and customer is willing to accept whatever that bid is. The broker/dealer B is willing to pay just the NBB and broker/dealer C is willing to pay the NBB+0.05. Broker/dealer C's pre-defined indication 46 is willing to improve the National Best Bid (NBB) by 5 cents. If the quote was 49-49⅛ at the time the order from the crowd came in, broker/dealer B's response is based on a price of 49, the best bid, broker/dealer C's relative response is 49 plus $0.05 for 1000 shares. Broker/dealer C had a pre-defined relative indication 44 at a higher price than broker/dealer B's pre-defined relative indication 44 and therefore has higher priority. Broker/dealer C's pre-defined relative indication 46 therefore satisfies the order 40 and thus broker/dealer C buys the 600 shares at 49 plus $0.05. Broker/dealer C is left with a remaining pre-defined relative indication 46' (FIG. 4) for future auctions of 400 shares. Broker/dealer B missed buying because broker/dealer B's pre-defined relative indication 44 was for an inferior price than the pre-defined relative indication 46 of broker/dealer C. Broker/dealer B was only willing to pay the customer the best bid, not the best bid plus $0.05.

The automated auction system 20 will forward the executions to the exchange for validation, trade reporting and clearance.

Figure 4:
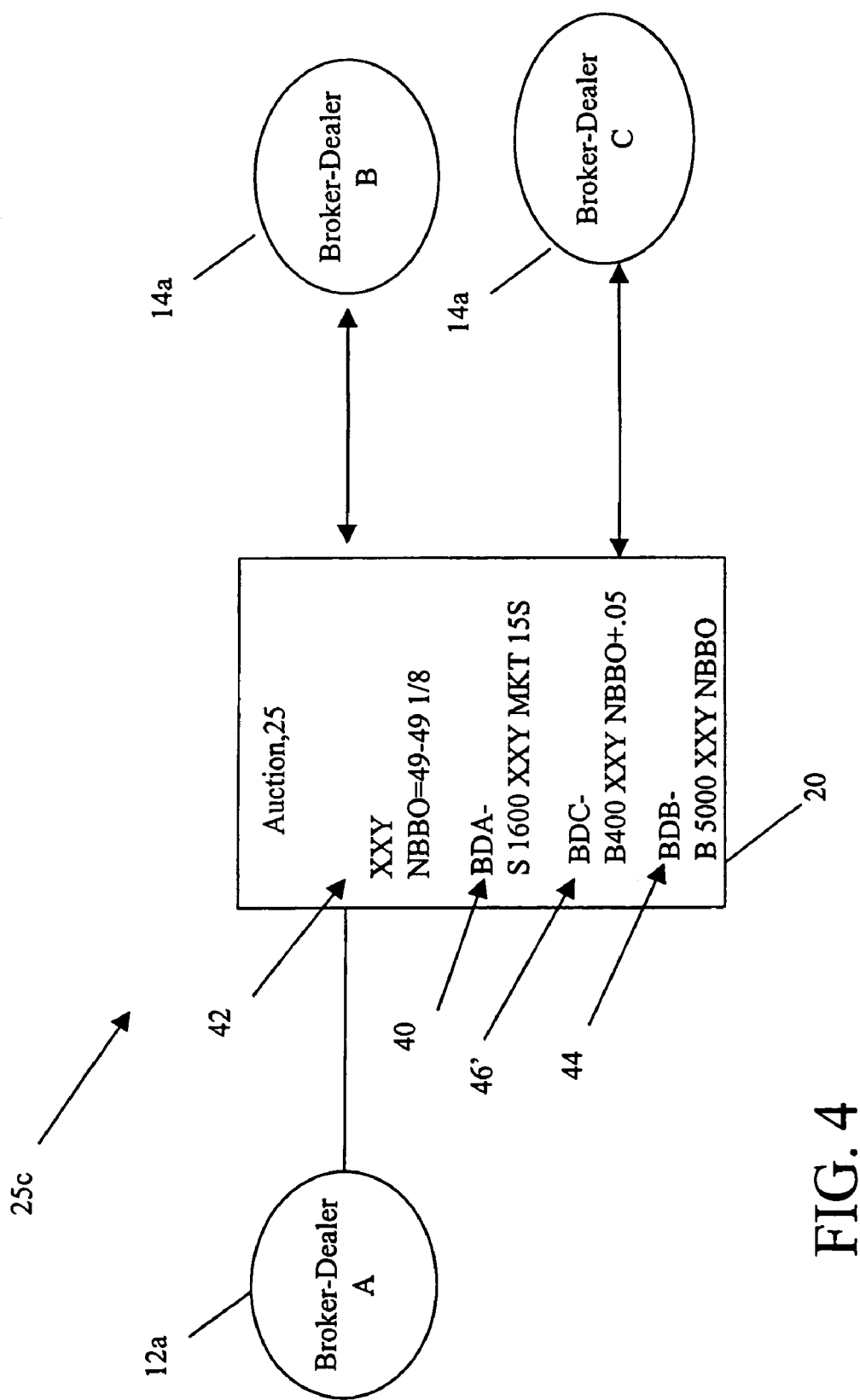

Referring now to FIG. 4, broker/dealer C has a remaining pre-defined relative indication 46' for future auctions of 400 shares. This pre-defined relative indication 46' will still be available at the same priority for future auctions. The auction process 20 includes two auction parameters that are set for all pre-defined relative indications.

The two auction parameters are used to manage exposure, but may also have the effect of governing the relative position of the pre-defined relative indications after exhaustion of one of the parameters, and can completely exhaust the predefined relative indication for the other parameter. These parameters are used to give a participant an ability to manage financial exposure. These parameters also guarantee that no one participant or indication would maintain preferential position in the auction. One parameter is a maximum share amount per indication and the other is a maximum share amount per auction.

If broker/dealer C has not exceeded the maximum share amount per auction it can participate in the current auction in which case its pre-defined relative indication 46' will retain its time priority and therefore can match with another order 40 for here 400 shares entered by broker/dealer A. If the maximum share amount per auction for broker/dealer C's pre-defined relative indication had been exhausted, then that pre-defined relative indication 46' is lowered in time priority to the end of a queue for that price grouping. If the maximum share amount per indication has been exhausted, then the pre-defined relative indication 46' is extinguished completely.

A pre-defined relative indication, therefore, is a willingness or an expression to trade that resides in the system and remains dormant and unseen by other participants. This mechanism also allows trading interest to remain anonymous as to price, size and identity. A pre-defined relative indication, when activated, becomes a response that is priced relative to the National Best Bid/offer (NBBO). The automated auction system 20 will forward the executions to the exchange for validation, trade reporting and clearance.

Figure 5:
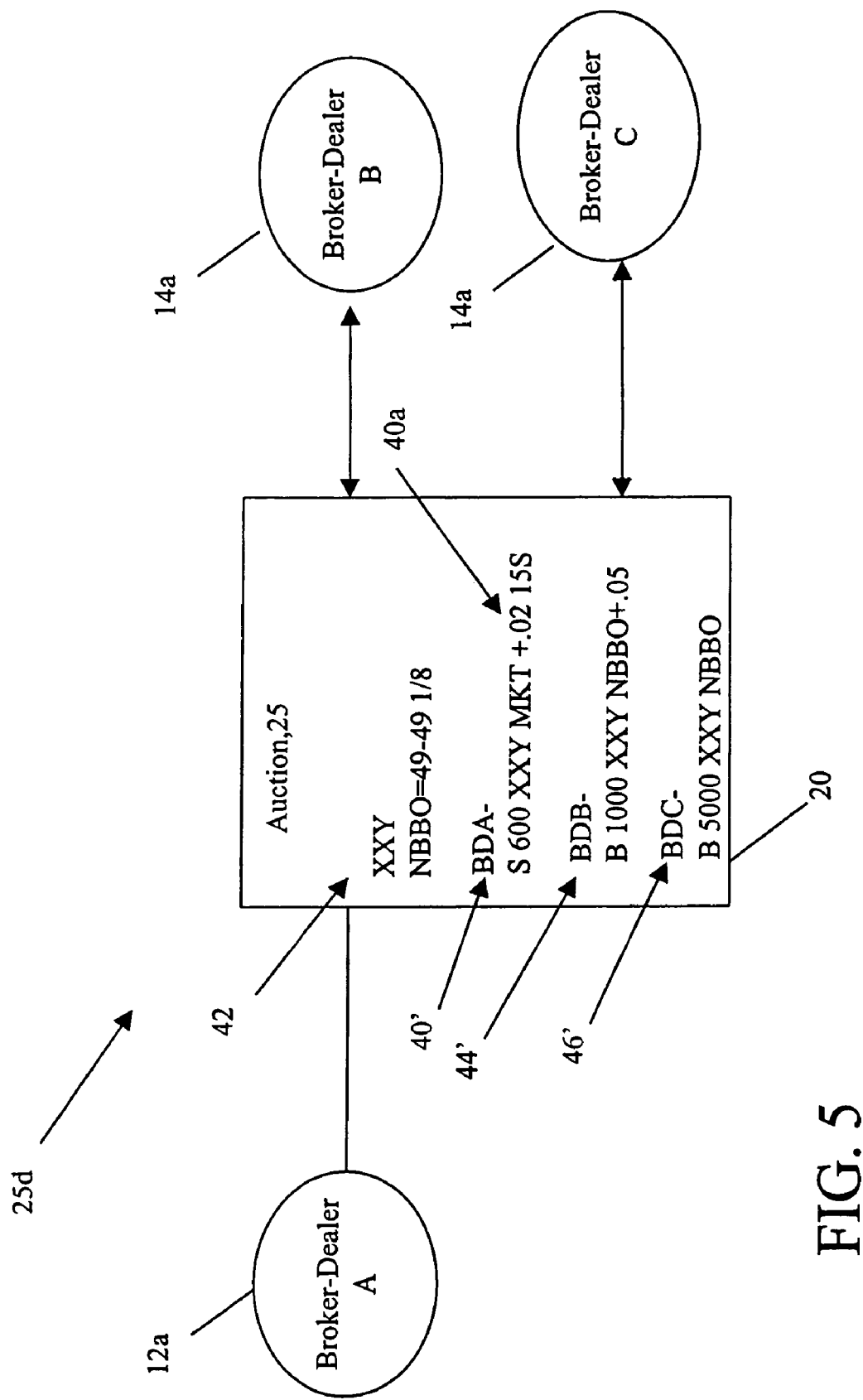

Referring now to FIG. 5, a fourth auction example 25d is shown. In this example 25d, a customer order 40' and condition 40a are entered to sell 600 shares of "XXY". The condition 40a is that the order seeks a specific minimum price improvement of "0.02". Thus, the order is at the market (i.e., at the national best bid NBB at the time of the order execution) plus a minimum price improvement of 2 cents. The exposure time is 15 seconds. The exposure does not reveal the 0.02 condition. This example is illustrative of a conditioned order within the example of two pre-defined relative indications.

In this auction example 25d, the customer order 40' seeks specific minimum price improvement. Broker/dealer B and broker/dealer C have each pre-defined relative indications 44', 46'. Broker/dealer B's pre-defined relative indication 44' improves the National Best Bid (NBB) by 5 cents. If the quote was 49-49⅛ at the time the order from the crowd came in, broker/dealer B's indication 44' is based on a price of 49, the best bid, and thus broker B has a relative response of 49 plus $0.05 for 1000 shares. Because broker/dealer B's pre-defined relative indication 44' satisfies the order and all conditions of the order, the order is matched with broker/dealer B response. Broker/dealer B buys the 600 shares at 49 plus $0.05. Since broker/dealer B had a pre-defined indication 44 for a larger amount than the sell order of the customer, the order is filled completely, and broker/dealer B is left with a remaining pre-defined relative indication of 400 shares for future auctions. Broker/dealer C missed buying because broker/dealer C's pre-defined relative indication 46 was at a lower price than the pre-defined relative indication 44 of broker/dealer B. Broker/dealer C was only willing to pay the customer the best bid, not the best bid plus $0.05. The automated auction system 20 will forward the executions to the exchange for validation, trade reporting and clearance.

Figure 6:
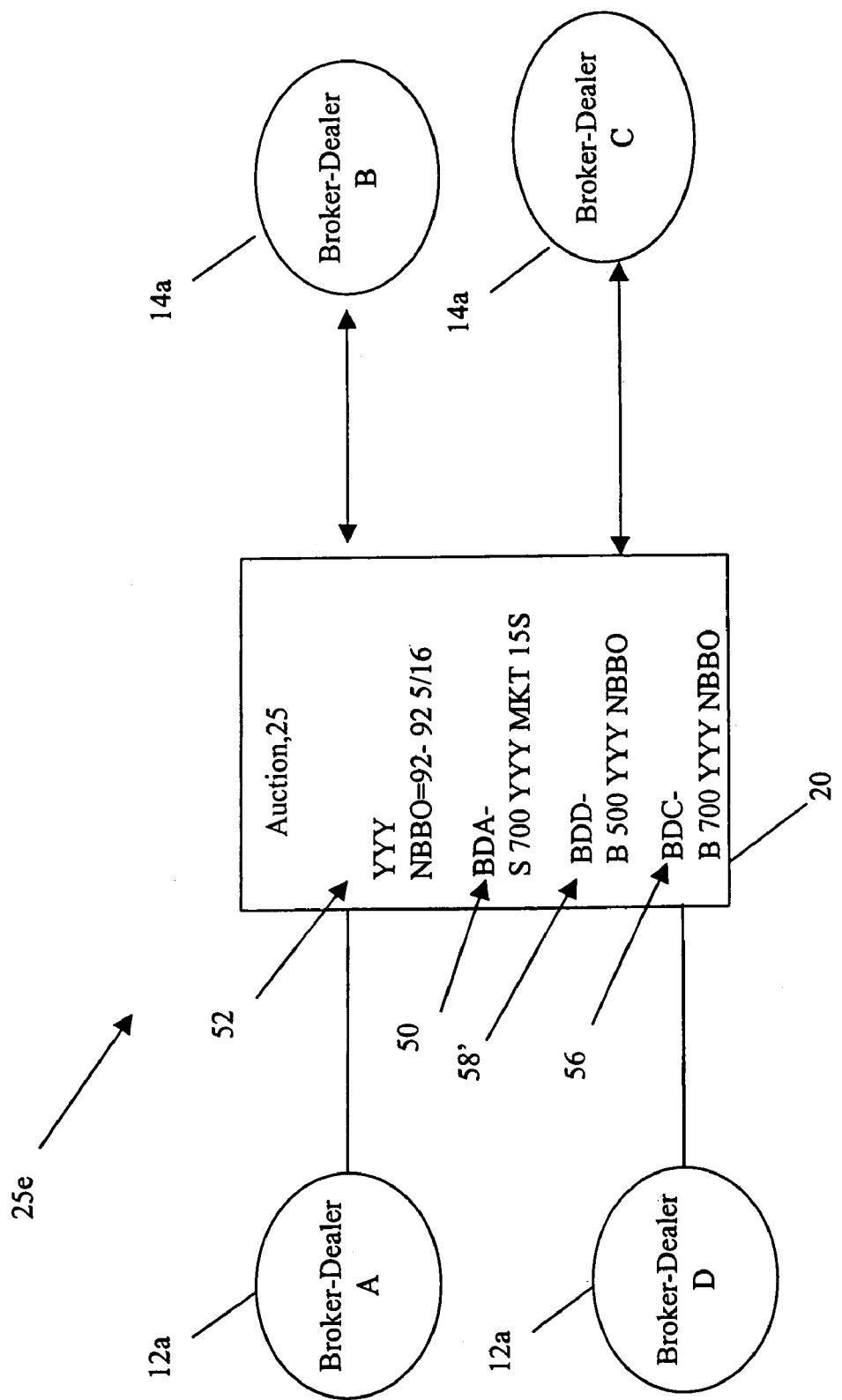

Referring now to FIG. 6, a fifth auction example 25e is shown. Broker/dealer A enters a customer order 50 to sell 700 shares of "YYY" at the market. The order 50 has an exposure time of 15 seconds. Stock "YYY" has an NBBO 52 of 92-92⁵⁄₁₆. Shortly after, another order 58' to buy 500 shares of "YYY" at the market is entered for another customer by broker/dealer D. Both Broker/dealer B and C receive notification that an auction to sell 700 shares of "YYY" has started. Only broker/dealer C sends a response 56, subsequent to entry of the customer order of broker/dealer D. The automated auction system 20 executes the trade between the two customer orders of Broker/dealer A and Broker/dealer D, since the customer order of Broker/dealer D was entered before Broker/dealer C responded. The order execution price is the mid-point of the NBBO, i.e., the mid-point of the spread, which in this example is 92⁵⁄₃₂. The remainder of the order (200 shares) is executed with Broker/dealer C at the NBBO. The automated auction system 20 will forward the executions to the exchange for validation, trade reporting and clearance.

Figure 7:
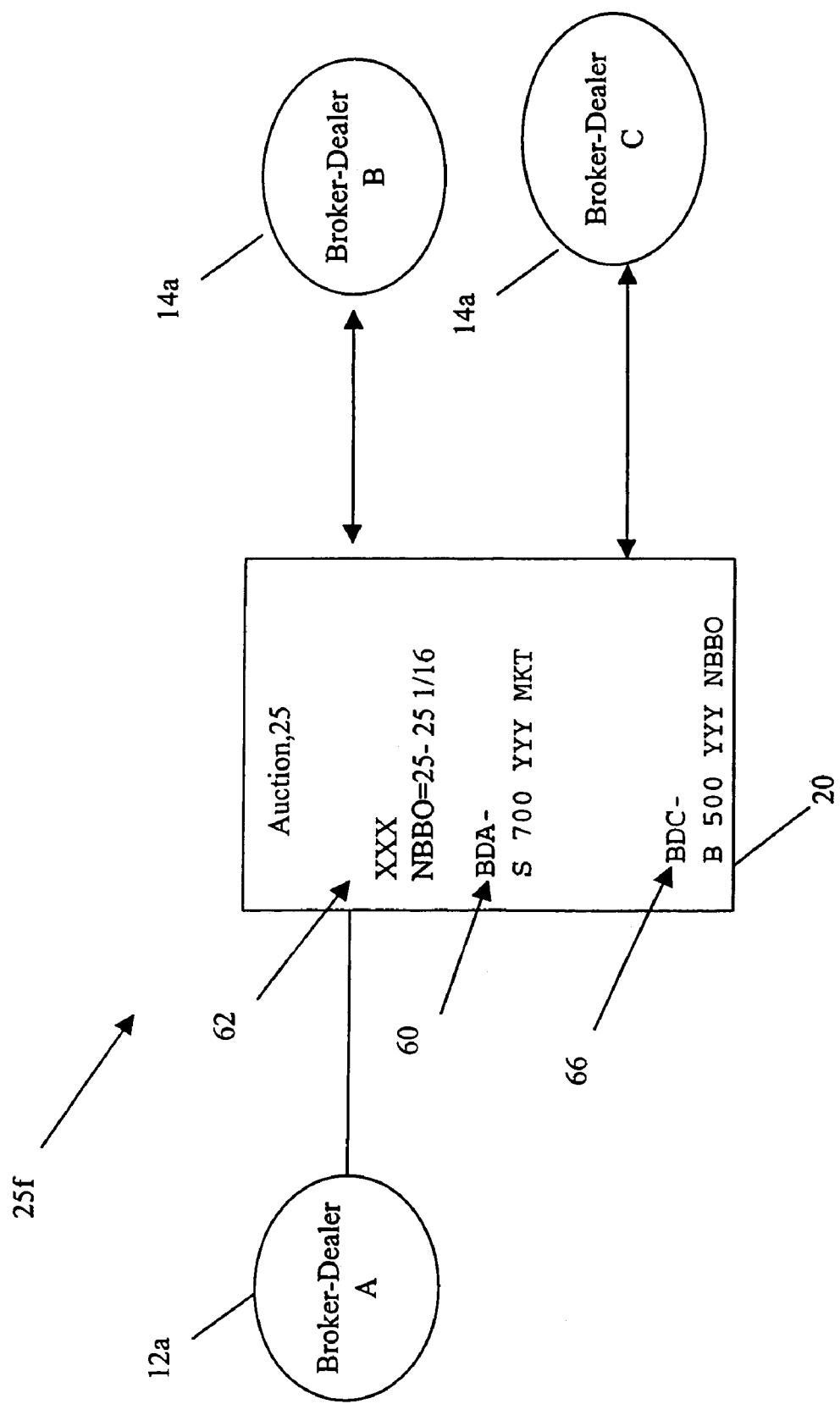

Referring now to FIG. 7, in example 25f broker/dealer A enters a customer order 60 to sell 700 shares of stock "YYY" at the market. The order 60 has an exposure time of 15 seconds. The NBBO for "YYY" is 25-25¹⁄₁₆. Both Broker/dealer B and C receive notification that an auction to sell 700 shares of "YYY" has started. Only broker/dealer C elects to respond 66 to buy only 500 shares.

The automated auction system 20 will execute the order between Broker/dealer A and Broker/dealer C for 500 shares at the NBBO. The remainder of the order (i.e., 200 shares) remains active until the original 15 seconds elapses, at the end of which, if no other offsetting orders are entered on the opposite side of the market, and no other pre-defined relative indications or responses come in, the order balance of 200 shares is eligible for a market maker guarantee if it is a public order. That is, specially-designated market makers will guarantee the execution of the order at the NBB, thus buying 200 at the NBB existing at the end of the exposure period, i.e., 25, if the market were still 25-25¹⁄₁₆. If there still remains a balance after the end of the market maker guarantee, the balance is delivered to the best available market for the stock on other exchanges or markets unless requested otherwise, as described more fully below at the end of server process 100. The automated auction system 20 will forward the executions to the exchange for validation, trade reporting, and clearance.

Figure 8:
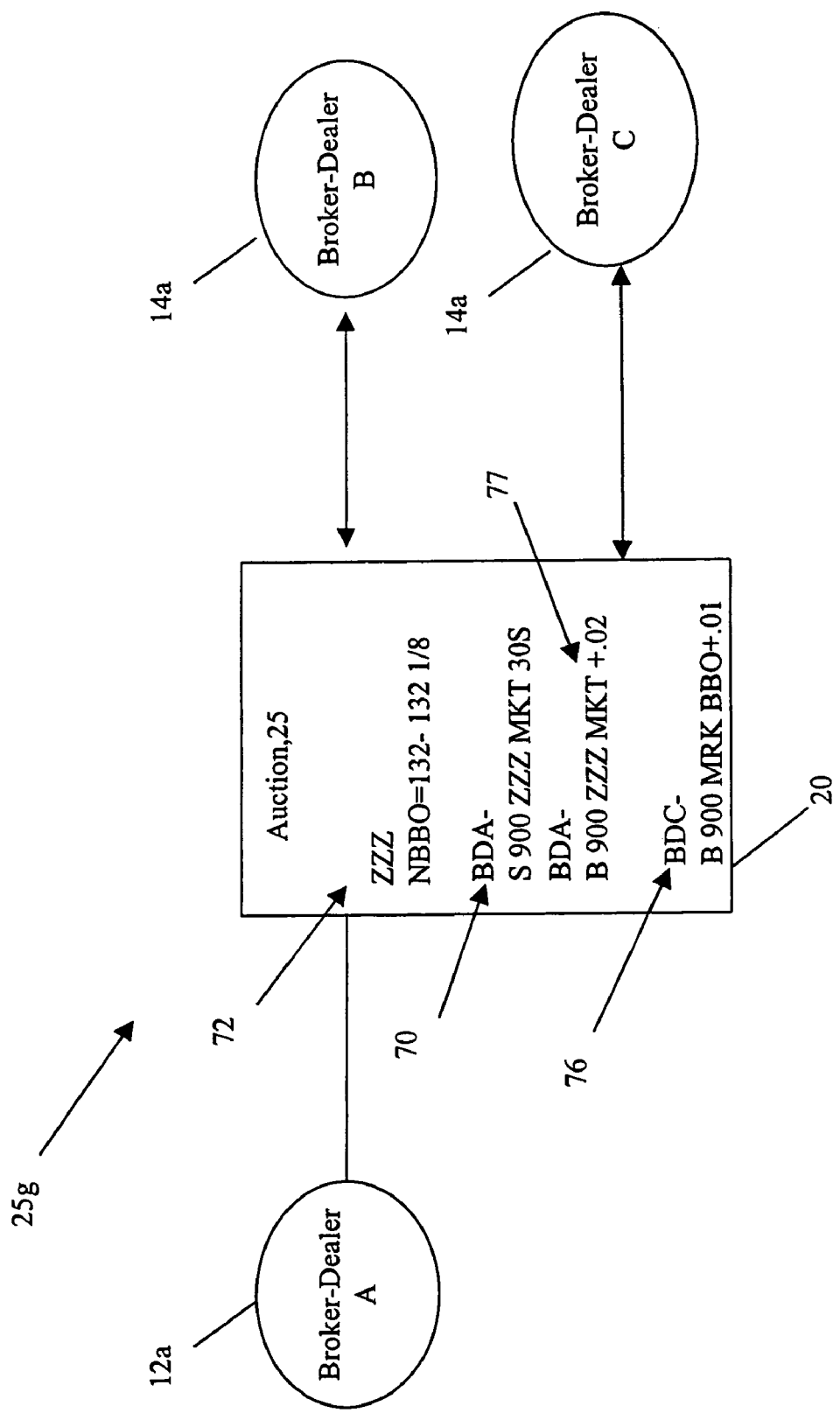

Referring now to FIG. 8, in example 25g broker/dealer A is a market maker that trades with its own customers. Broker/dealer A enters a customer order 70 to sell 900 shares of stock "ZZZ" at the market. Broker/dealer A enters this order with a special condition. There can be several special conditions. Examples of special conditions include matching the nominal price improvement of the crowd, sharing up to a 50 split, and block match trading. The Broker/dealer determines the trade condition at order entry. Using the price improvement match condition, that condition allows broker/dealer A to trade with its customer unless the crowd responds with more than a nominal price improvement, e.g., better than NBBO+0.02 cents.

In this example, the order 70 has an exposure time of 30 seconds. The stock "ZZZ" has a NBBO 132-132⅛. Both Broker/dealer B and C receive notification that an auction to sell 900 shares of "ZZZ" has started. Only broker/dealer C elects to respond, with a relative response 76 of NBBO+0.01. The automated auction system 20 will execute the entire order between Broker/dealer A and Broker/dealer A's customer at NBBO+0.01 cents because no crowd member provides more than the nominal price improvement e.g., 0.02.

If Broker/dealer's C response was for NBBO+0.03 cents, the order would have been executed with broker/dealer C up to the size of broker/dealer C's response, since in this example, broker/dealer C would have provided more that nominal price improvement. The automated auction system 20 will forward the executions to the licensed exchange for validation, trade reporting, and clearance.

The 50% split trading condition allows the crowd to obtain up to a set percentage e.g., 50% of the order at various prices. If there is crowd interest beyond 50% of the order, the broker/dealer will trade at the prices of the crowd interest that is beyond 50% of the order, and for any balance beyond that the broker/dealer will trade at the NBBO. For block match trading, the broker/dealer specifies an amount that the broker/dealer would facilitate the block at after the crowd had an opportunity to respond up to some portion of the block, e.g., 20%. The broker/dealer would take the 20% of the block with the crowd having an opportunity for the balance. If there are no responses, the dealer takes 20% of the block and the balance is unexecuted. The unexecuted balance could execute outside of the system. If there is crowd interest, the crowd trades for portions of the block at various prices up to 80% of the block, and the broker/dealer trades for any remainder of the block. If there is crowd interest beyond 80%, the broker dealer trades at the price established by the crowd up to the crowd interest, i.e. the quantity specified by the crowd. Any balance will trade at the NBBO.

The broker/dealers can also act as principals, i.e., act for their own account or as registered market makers. A registered market maker is a type of broker/dealer that has its own distribution network for the receipt of orders. For instance, large brokerage houses may have many branch offices and receive orders from those branch offices. They can execute the orders internally meaning that if they are a market maker on a specific security, they will execute the trade themselves instead of delivering the trade to an exchange for exposure and/or interaction with others for execution. The auction system 10 enables the order to obtain the best price available regardless of whether the broker/dealer entering it is acting as a registered market maker or in a principal, riskless principal, or agency capacity.

Referring now to FIG. 9A, an exemplary format for an order entry 101 for the auction system 10 is shown. The order entry 101 includes information 101a entered by the order entry side of the auction. The information can include a security symbol, an indication of whether the order is to buy or sell, a quantity, an exposure period, and price, either fixed, market or conditions such as a price improvement relative to the NBBO or other conditions all or none etc. The order entry 101 is transmitted 101b to the auction system 20. Orders with a fixed price may be treated differently (executed immediately i.e., a zero second order or canceled) depending on regulatory requirements.

Referring now to FIG. 9B, a format for a response 114 is also shown. The response 113 includes information 115a including a security symbol, a price or a price improvement, a quantity of shares and a buy/sell indication. The response information 115a is also transmitted 115b to the auction system 20 and is placed in a queue (not shown).

Referring now to FIG. 9C, a format for a pre-defined relative indication 107 is shown to include an information portion 107a which includes a security symbol, a relative price improvement, a quantity and an indication type, either buy or sell. The information 107a is also transmitted 107b to the auction system 20. In the auction system 20 the pre-defined relative indication is sorted 107c by type, e.g., buy or sell and by price and time received.

Figure 10A:
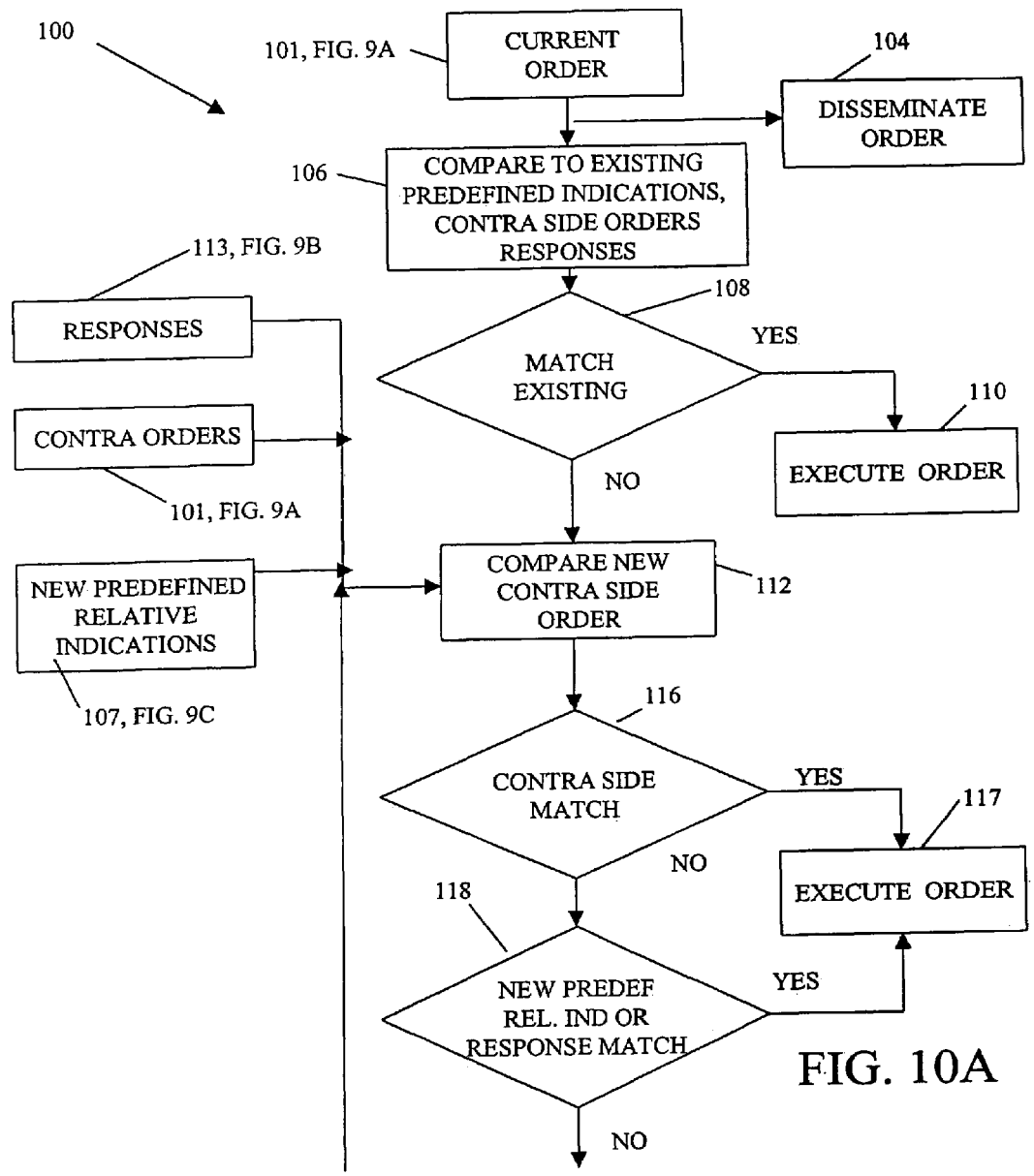
FIGS. 10A-10C are flow charts showing the auction process used in the system of FIG. 1.
Figure 10B:
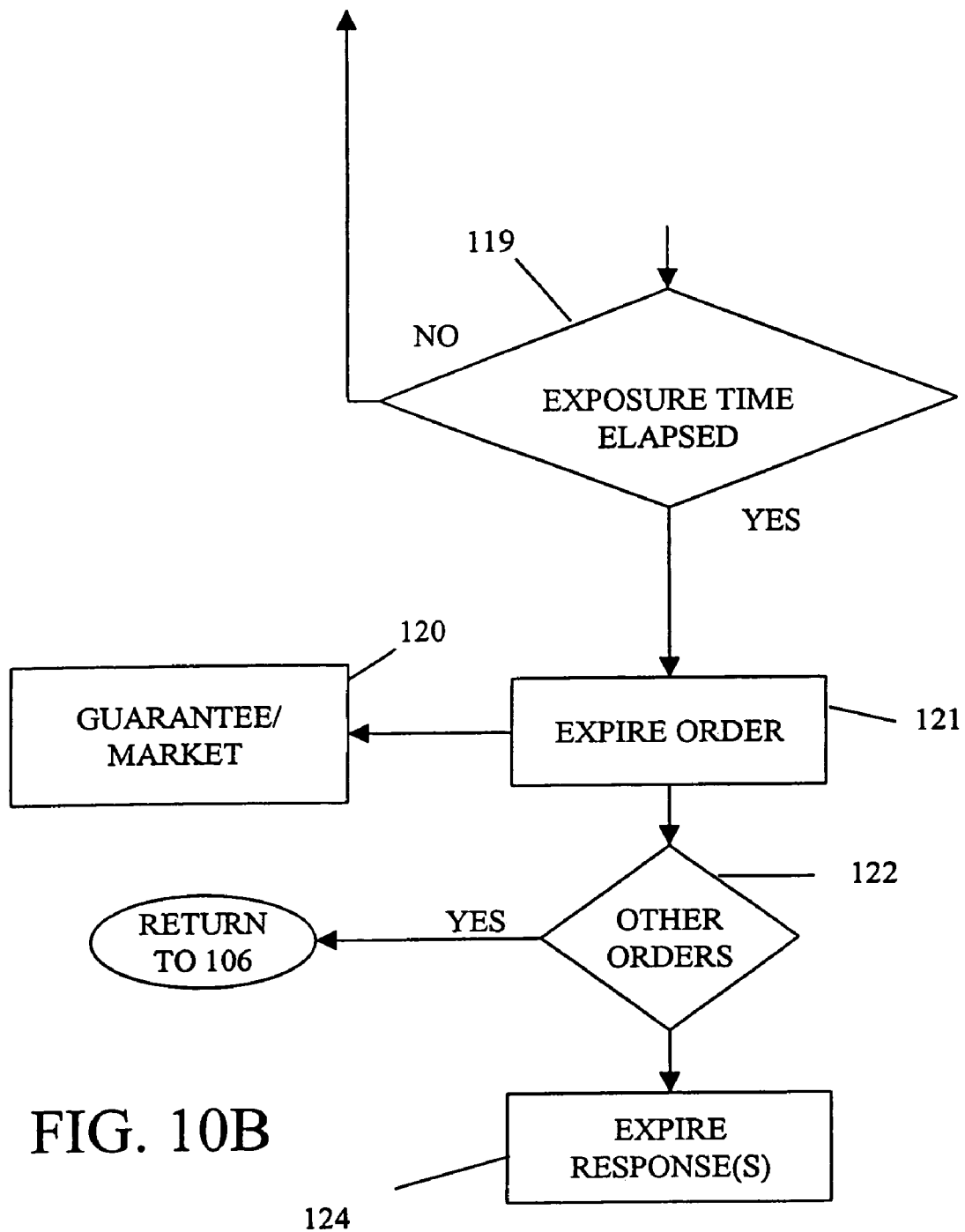

Referring now to FIGS. 10A-10B, a server process 100 that may be executed on the auction system 20 is shown. The server process 100 receives an order 101 entered by the order side 12 of the system 10, via the order entry format 101 (FIG. 10A). The process 100 exposes 104 the order to the crowd, i.e., potential responders 14, via an electronic broadcast over the network systems mentioned above. The system 10 displays the size of the order and the order remains displayed for the life span of the order or until an execution ends the auction. The process 100 compares 106 the order to any existing pre-defined relative indications, contra-side orders or responses (if responses are chosen to have a lifetime as discussed below) that exist in the system 10 at order receipt.

If there are pre-defined relative indications or contra-side orders or responses (if responses have a lifetime) in the system 10, the process 100 will attempt to match 108 those existing pre-defined relative indications or contra-side orders or responses to the order. For predefined relative indications, the match process 108 will examine the pre-defined relative indication that exists, at the best price and which is the oldest at that best price, and will determine whether that pre-defined relative indication matches any conditions that may exist with the order. The same criteria could be applied to existing contra-side orders or responses. If there is a match, the order will be executed 110 with that pre-defined relative indication.

If there is not a match, the process can iterate through a queue of pre-defined relative indications, contra-side orders and responses to determine the next oldest pre-defined relative indications, contra-side orders and responses at that best price to determine a match. The match process 108 attempts to find the pre-defined relative indications, contra-side orders and responses with the best price improvement or best price, as appropriate, and that is the oldest in the auction system 20 at that price improvement and which satisfies all conditions of the order and validating constraints that may apply. For example, if a price is specified outside of the NBBO it may be matched by the system 20 but will not pass validation. The system 20 can adjust the price so that it falls at the NBBO at the time of the execution.

If there are no matching existing pre-defined relative indications, contra side order or responses, the process 100 will continually receive contra side orders 101, responses 113, and newly arriving pre-defined relative indications 107. The process 100 will compare 112 contra side orders 101 to the current order. If there is a match it will execute the order. If there is no match the process 100 will determine if responses or new pre-defined relative indications 107 match 118 the current order.

The compare for contra side orders and then for responses or new predefined relative indications implies some preference for contra side orders. However, the process 100 could compare 112 contra side orders, responses and new pre-defined relative indications to the current order using an age and/or price criteria.

If there is a match it will execute the order. If there is no match the process 100 will determine if responses or new pre-defined relative indications 107 match 118 the current order. The process 100 will perform the compare and matches over a life span window that is determined by the exposure period specified 119 by the order entry 101. If the process 100 determines a match 116 or 118, the order will be executed 117. Otherwise, the process 100 will continue to wait until the exposure time period 119 specified in the order 101 has elapsed 118. If the process 100 does not receive a matching response within that time period, as shown in FIG. 10B, the process 100 will expire 124 the auction process for that order.

The process 100 will determine 122 whether there are other orders in the auction and, if there are other auctions, will return to compare 106 the other received orders to the pre-defined relative indications and so forth to start a new auction. If the process 100 expires the order 119, the process 100 will also send 120 the expired order or any unexecuted portion of the order to a guarantee process and/or execution outside of the process 100.

An alternative arrangement to that shown above could have the process 20 allow responses to have a lifespan coextensive with the lifespan of the auction process. If the system 20 allows responses to have a lifespan, but if there are no other orders, the process 100 will expire (not shown) all remaining responses in the system 20.

Another example would have the compare 106 and match 108 performed only for predefined relative indications. If there was not a match with a predefined relative indication, the process 100 would iterate through a queue of pre-defined relative indications to determine the next oldest pre-defined relative indication, at that best price to determine a match. The match process 108 attempts to find the pre-defined relative indication with the best price improvement, and that is the oldest in the auction system 20 at that price improvement and which satisfies all conditions of the order and validating constraints that may apply.

A still further option could have the entry of an order start an auction process at which time the auction system 20 could collect all responses over the exposure duration. The auction system would then sort the received responses by some criteria that produces the best response based on price and size.

Figure 10C:
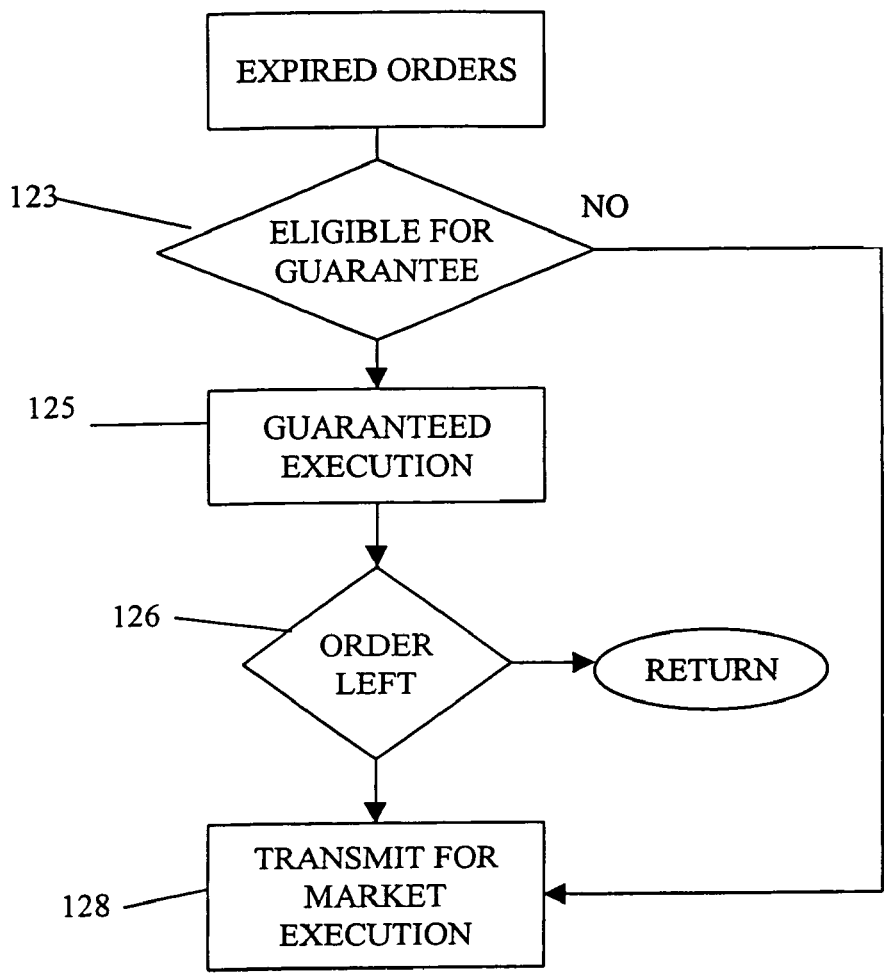

Referring now to FIG. 10C, the expired order or any remaining portion thereof is transmitted 120, if qualified 123 for guaranteed execution 125, against certain designated market makers who will be matched with the order at the prevailing NBBO, up to the lesser of an established threshold (e.g. 1099 shares and is a public agency order) or the size associated with the NBBO. If, after any match has occurred, an unexecuted balance still remains 126, that order balance is transmitted 128, (unless the customer has indicated otherwise) to the market quoting the best price in that stock, such market being another exchange or market that trades the security and with which there is maintained a link for delivering orders. For example, in the case of an exchange-listed stock the link that would be used currently is the Intermarket Trading System (ITS), or, in the case of a Nasdaq stock, the link would be Small Order Execution System (SOES$^{SM}$) and/or SelectNet$^{SM}$, or a successor system. Thus, at each stage of the process, from auction, through market maker guarantee, and then, if there is a balance, through to other market centers, the original order has an opportunity for price improvement, but in any case should always obtain the best prices publicly available in the marketplace as a whole.

Figure 11:
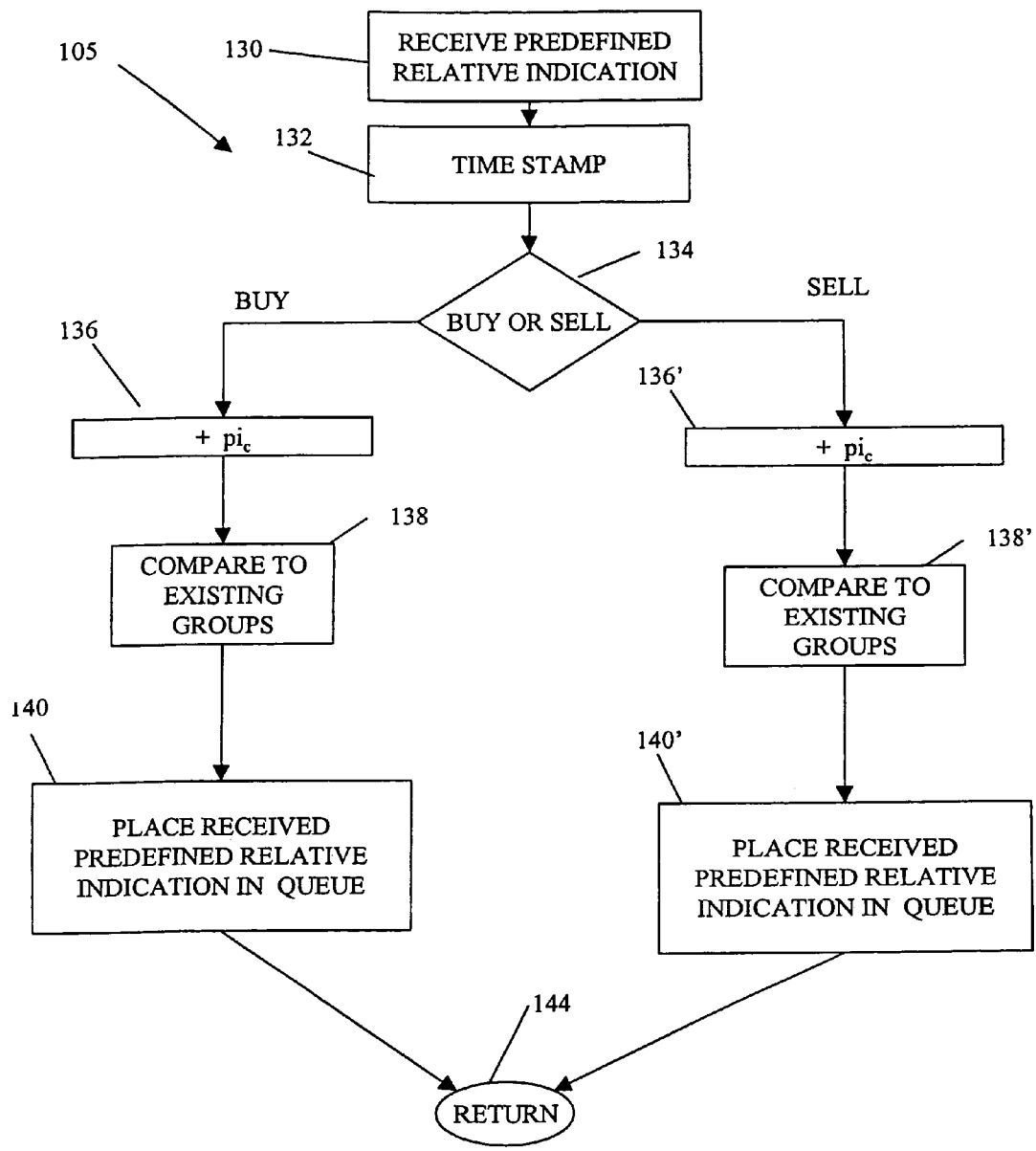
FIG. 11 is a flow chart showing a pre-defined relative indication queue ordering process.

Referring now to FIG. 11, a pre-defined indication ranking process 105 is shown for ranking pre-defined indications by price improvement and time received. The pre-defined indication ranking process 105 receives 130 a pre-defined relative indication and assigns 132 it a time stamp. The process determines 134 whether the pre-defined relative indication is for a buy or a sell. If the pre-defined relative indication is for a buy, the process 105 parses 136 the pre-defined relative indication to extract the price improvement "pi", as specified in the pre-defined relative indication. This price improvement "pi" is compared 138 to previously received price improvements "$pi_q$." The compare process 138 looks to find a previously received price improvement grouping that is equal to, greater than, or less than the current price improvement. If the process 105 finds a price grouping that is equal to a current price improvement "pi" the process 105 places 140 the received pre-defined relative indication at the end of that price improvement grouping. Otherwise, a new grouping at the highest, lowest, or at an intermediate price improvement level is produced for the received pre-defined relative indication.

The process 105 will perform a similar sorting process 105 including comparing 138' and placing the received pre-defined relative indication into a price improvement grouping if the received pre-defined relative indication is determined 134 to be a sell indication. After the process 105 sorts the received pre-defined relative indication, it returns 144. The process can keep track of the pre-defined relative indication by use of a queue (not shown).

Figure 12:
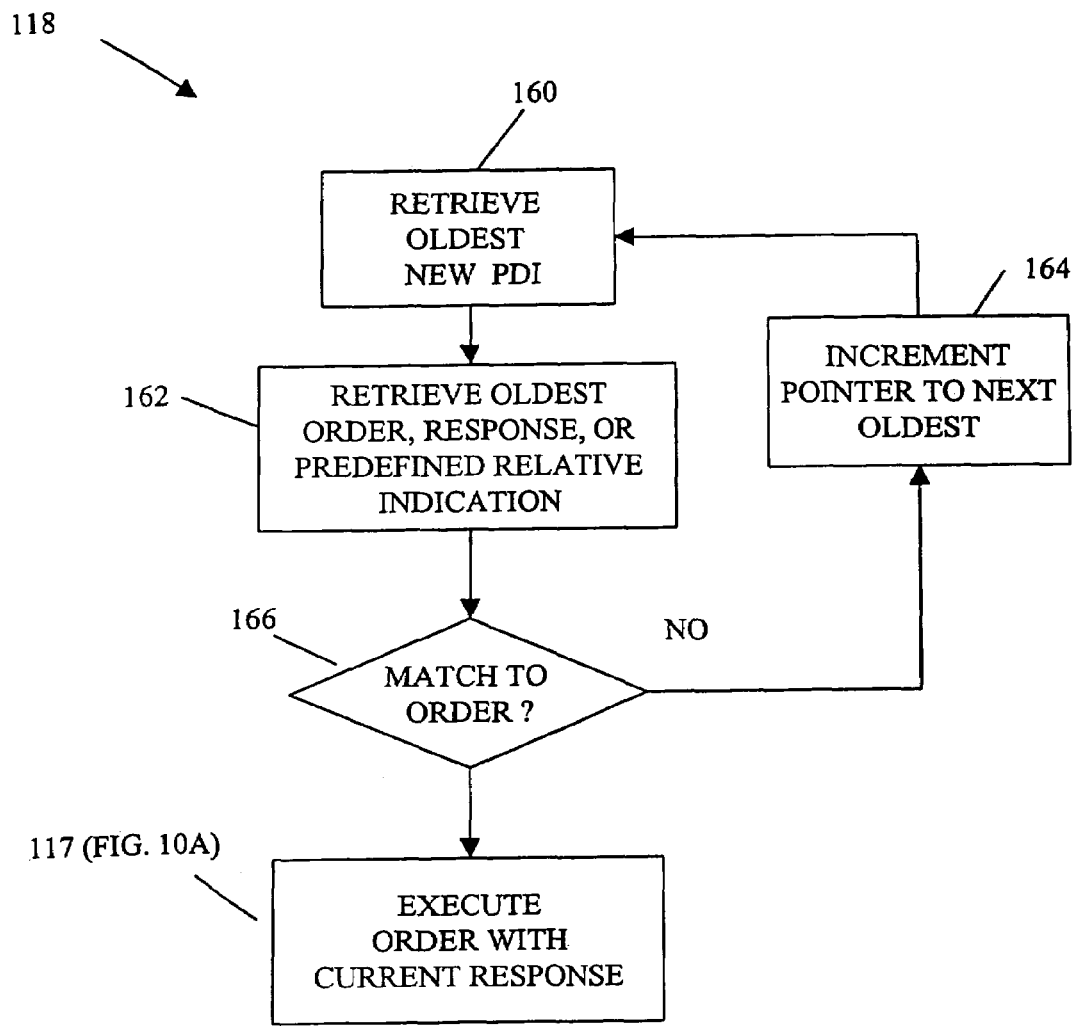
FIG. 12 is a flow chart of a response match process used in the process of FIGS. 10A-10C.

Referring now-to FIG. 12, the match process 118 is shown. At the initiation of the auction, the match process 118 retrieves 160 any response or new pre-defined relative indication in the auction system 20. The match process 116 determines if the retrieved new pre-defined relative indication or a response matches 162 to the current order. If there is a match 166, the match process 118 will tentatively execute 117 (FIG. 10A) the order with the matched response 113, or new pre-defined relative indication 107 or newly arriving contra side orders. If there is not a match, the match process 118 will increment a pointer for example, to the next oldest pre-defined relative indication or will examine a new response. The match process 118 retrieves 160 the next oldest pre-defined relative indication and will repeat the match process 118 to determine if the retrieved pre-defined relative indication or a new response matches 162 the order. If there is a match, the match process 118 will execute 117 the order with the matching response, pre-defined relative indication. The match process 118 will continue until the lifetime period has expired or until an order has been executed.

The match process 108 (FIG. 10A) matches orders with pre-defined relative indications that pre-existed at order entry. The match process 108 matches first on the basis of best price and then on the basis of oldest pre-defined relative indication at the best price. On the other hand, the match process 118 matches against active responses, and subsequently received pre-defined relative indications by the oldest that meets the terms of the order.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. For example the auction process can be used with other products such as goods, commodities, works of art, etc. It is especially suitable for items that have a value that can change over time in accordance with fluctuations in market conditions.

What is claimed is:

1. A method executed over a distributed networked system, said method comprising:
    using one or more computer systems for;
        retrieving a received, pre-defined relative indication that corresponds to a willingness by a participant to either buy or sell shares of a financial product, the pre-defined relative indication at a single price that is relative to a disseminated indicator of a prevailing current market price and specifying a single total share quantity value, with the existence of the pre-defined relative indication being undisclosed to other participants in the distributed network system;

receiving an order specifying a relative price and quantity, and upon receiving the order;

determining that the retrieved pre-defined relative indication has a relative price that satisfies the relative price of the received order; and matching the received order against the pre-defined relative indication to satisfy the order.

2. The method of claim 1 wherein the received, pre-defined relative indication is received over the distributed networked computer system.

3. The method of claim 1 wherein the price of the order is a relative price.

4. The method of claim 1, wherein one or both of a condition on the order and the quantity specified by the pre-defined relative indication are undisclosed before and after the order is executed.

5. The method of claim 1 wherein matching predefined relative indication to the order, comprises:

examining the pre-defined relative indication that exists, at the best price and which is the oldest at that best price; and if the pre-defined relative indication matches the order executing the order with that pre-defined relative indication.

6. The method of claim 5 wherein matching further comprises:

determining if the order has conditions attached to the order; and determining whether the pre-defined relative indication matches the determined conditions on the order before executing the order with that pre-defined relative indication.

7. The method of claim 6 wherein the conditions attached to the order are at least one of the orders seeks a specific minimum price improvement, matching the nominal price improvement of the crowd, sharing up to a 50 split, and block match trading.

8. The method of claim 1 wherein the order is of a type that includes one of a public agency order type and a professional order type.

9. The method of claim 1 wherein the price specified by the pre-defined relative indication is the relative price and further has a condition offering a price improvement relative to the current market price.

10. The method of claim 1 wherein the current market price specifies a price for buying the shares of the financial product and a price for selling and matching further comprises:

executing the order against one or more pre-defined relative indications at a price that is a midpoint of the price for buying the shares of the financial product and the price for selling the shares of the financial product at the current market price.

11. The method of claim 1 wherein the current market price specifies a price for buying the shares of the financial product and a price for selling and matching further comprises:

executing the order against the pre-defined relative indication at the price that is specified by the order.

12. The method of claim 1 wherein a plurality of pre-defined relative indications and responses are entered and matching further comprises:

collecting all pre-defined relative indications, and immediately executing the order against an optimal one or more of the pre-defined relative indications, with the optimal one determined in accordance with price and time; and automatically leaving any remaining pre-defined relative indications available to participate in a subsequent matching process.

13. The method of claim 1 wherein a plurality of pre-defined relative indications are entered and matching the received order against the pre-defined relative indication further comprises:

immediately executing the pre-defined relative indication against the order, the pre-defined relative indication being selected from the plurality of pre-defined relative indications.

14. A computer program product tangibly embodied on a computer readable medium, the computer program product comprising executable instructions for causing a computer to:

store received pre-defined relative indications corresponding to a willingness to buy or sell shares of a financial product, the pre-defined relative indications specifying a single price that is relative to a disseminated indicator of a prevailing current market price and specifying a single total share quantity value, with the existence of the pre-defined relative indications being undisclosed;

receive an order specifying a price and a quantity;

retrieve the stored pre-defined relative indications;

determine that a first one of the stored pre-defined relative indications has a relative price that satisfies the price of the received order; and match the received order against the pre-defined relative indication to satisfy the order.

15. The computer program product of claim 14 wherein instructions to match further comprise instructions to:

immediately execute the order against the pre-defined relative indication in accordance with a time associated with the pre-defined relative indication.

16. The computer program product of claim 14 wherein instructions to match further comprise instructions to:

collect all pre-defined relative indications; and execute the received order against an optimal one or more of the pre-defined relative indications determined in accordance with price and time.

17. The computer program product of claim 14 wherein the order is of a type that includes one of a public agency order type and a professional order type.

18. The computer program product of claim 14 wherein the current market price specifies a price for buying the shares of the financial product and a price for selling the shares of the financial product and the computer program product further comprises instructions to:

execute the order against one or more pre-defined relative indications at a price that is a midpoint between the price for buying the shares of the financial product and the price for selling the shares of the financial product at the current market price.

19. A system for trading financial products over a distributed networked computer system, said system comprising:

a plurality of systems for entering pre-defined relative indications, each pre-defined relative indication corresponding to a willingness to buy or sell shares of a financial product, the pre-defined relative indications specifying a single price that is relative to a disseminated indicator of a prevailing current market price for the financial product and specifying a single total share quantity value, with the existence of the pre-defined relative indications, with a pre-defined relative indication entered from one of the plurality of system being undisclosed to participants at the other systems;
a server computer coupled to the systems for receiving the pre-defined relative indications, said server computer executing a server process that for an order, retrieves stored pre-defined relative indications; and
matching one of the pre-defined relative indications against the order based on determining that the one of the pre-defined relative indications satisfies the terms of the order. with matching occurring in a computer system in communication with the distributed electronic network system.

20. The system of claim 19 wherein the plurality of systems is a first plurality of systems, the system further comprising:
a second plurality of systems for entering orders for the financial product, the orders specifying a relative price and a quantity.

21. The system of claim 19 wherein the one of the pre-defined relative indications matched against the order is matched in accordance with a time of receipt of the pre-defined relative indication.

22. The system of claim 19 wherein the current market price specifies a price for buying the shares of the financial product and a price for selling the shares of the financial product and the server computer is configured to:
execute the order against one or more pre-defined relative indications at a price that is a midpoint between the price for buying the shares of the financial product and the price for selling the shares of the financial product at the current market price.

23. The system of claim 19, wherein the server computer is configured to:
collect all pre-defined relative indications, and immediately execute the order against an optimal one or more of the pre-defined relative indications, with the optimal one determined in accordance with price and time; and
automatically leave any remaining pre-defined relative indications available to participate in a subsequent matching process.

24. The system of claim 19, wherein the server computer is configured to:
sort the pre-defined relative indications by level of price improvement and within a price level:
sort the pre-defined relative indications by time of receipt.

25. A method executed over a distributed electronic network system, said method comprising:
performed using one or more computer systems for;
receiving an order for a financial product, the order having terms specifying a price and a quantity;
retrieving pre-defined relative indications each of which corresponds to a willingness to buy or sell shares of a financial product, with the pre-defined relative indications specifying a single price that is relative to a disseminated indicator of a prevailing current market price, the existence of each of the pre-defined relative indications being undisclosed, and wherein only receipt of an order initiates a transaction involving the financial product; and
matching one of the pre-defined relative indications against the order based on determining that the one of the pre-defined relative indications satisfies the terms of the order, with matching occurring in a computer system in communication with the distributed electronic network system.

26. The method of claim 25, further comprising disclosing details of price and quantity of the pre-defined relative indication to parties to a transaction involving the pre-defined relative indication that was matched against the order, the disclosing occurring after the matching.

27. The method of claim 25 wherein matching further comprises:
executing the order against the pre-defined relative indication in accordance with a time of receipt of the pre-defined relative indication.

28. The method of claim 25 wherein matching further comprises:
collecting all pre-defined relative indications, and executing the order against an optimal one of the pre-defined relative indications.

29. The method of claim 25 wherein a plurality of pre-defined relative indications are entered, said method further comprising:
sorting the pre-defined relative indications by level of price improvement and within a price level; and
sorting the pre-defined relative indications by time of receipt.

30. The method of claim 25 wherein the current market price specifies a price for buying the shares of the financial product and a price for selling and matching further comprises:
executing the order against one or more pre-defined relative indications at a price that is a midpoint of the price for buying the shares of the financial product and the price for selling the shares of the financial product at the current market price.

31. A computer program product tangibly embodied on a computer readable medium for buying or selling products over an electronic network, the computer program product comprising executable comprising instructions for causing a computer to:
retrieve pre-defined relative indications, each of which corresponds to a willingness to buy or sell shares of a financial product, the pre-defined relative indications specifying a single price that is relative to a disseminated indicator of a prevailing current market price, the existence of the pre-defined relative indications being undisclosed, wherein only receipt of an order initiates a transaction involving the financial product;
receive an order for a product;
receive responses to the order, the responses being either immediately executed against the order or canceled; and
match the order against a first one of the pre-defined relative indication to satisfy the order for the product, and automatically canceling any remaining responses that were not executed, while leaving any remaining pre-defined relative indications stored and available to participate in a subsequent transaction.

32. The computer program product of claim 31 wherein instructions to match further comprise instructions to:
execute the order against the pre-defined relative indication in accordance with a time of receipt of the pre-defined relative indication.

33. The computer program product of claim 31 wherein instructions to match further comprise instructions to:
collect all pre-defined relative indications; and
execute the order against an optimal one of the pre-defined relative indications.

34. The computer program product of claim 31, further comprising instructions to:
disclose details of price and quantity of the pre-defined relative indication to parties to a transaction involving the pre-defined relative indication that was matched against the order, the disclosing occurring after the matching.

35. The computer program product of claim 31 wherein a plurality of pre-defined relative indications are entered, said computer program product further comprising instructions to:
   sort the pre-defined relative indications by level of price improvement; and
   within a price level, further sort the pre-defined relative indications by time of receipt.

36. A method executed over a distributed networked computer system, the method comprising:
   performed using one or more computer systems for;
   storing a pre-defined relative indication that corresponds to a willingness to either buy or sell shares of a financial product, the pre-defined relative indication specifying a single relative price that is relative to a disseminated indicator of a prevailing current market price and a single total share quantity value, with the existence of the pre-defined relative indication being undisclosed;
   receiving an order specifying a relative price that is relative to a current market price and quantity; and
   determining whether the relative price of the pre-defined relative indication satisfies the relative price of the order.

37. The method of claim 36, further comprising:
   matching the order against the pre-defined relative indication to satisfy the order, if the relative price of the pre-defined relative indication satisfies the relative price of the order.

38. The method of claim 37, further comprising:
   disclosing details of price and quantity of the pre-defined relative indication to parties to a transition involving the pre-defined indication that was matched against the order, the disclosing occurring after the matching.

39. The method of claim 36, further comprising:
   if the relative price of the pre-defined relative indication does not satisfy the relative price of the order;
   maintaining the order to match against future orders.

40. The method of claim 36, further comprising:
   if the relative price of the pre-defined relative indication does not satisfy the relative price of the order;
   determining whether an exposure time of the order has expired, and if the exposure time has expired;
   expiring the order.

41. The method of claim 36, further comprising:
   if the relative price of the pre-defined relative indication does not satisfy the relative price of the order;
   determining whether an exposure time of the order has expired, and if the exposure time has expired;
   expiring the order; and if the exposure time has not expired;
   maintaining the order to allow the order to match against future orders.

42. The method of claim 36, wherein the order is entered by a party acting as agent on behalf of a buyer or seller.

43. The method of claim 36, wherein the pre-defined relative indication originates from a party acting as agent on behalf of a buyer or seller.

44. The method of claim 36, wherein the order is entered by a principal, the order being selected from inventory held by the principal.

45. The method of claim 36, wherein the pre-defined relative indication originates from a principal acting for its own account.

46. The method of claim 36, wherein the order is entered by a principal acting as a riskless principal.

47. The method of claim 36, wherein the pre-defined relative indication originates from a riskless principal.

48. The method of claim 36, wherein an originator of the pre-defined relative indication is undisclosed.

49. The method of claim 36, wherein the order is entered by a party acting as a risk-less principal on behalf of a buyer or seller.

50. The method of claim 36, wherein the pre-defined relative indication is entered by a party acting as a risk-less principal on behalf of a buyer or seller.

51. The method of claim 36, wherein the pre-defined relative indication is maintained after a determination is made that the pre-defined relative indication does not satisfy a received order.

52. A method executed over a distributed networked computer system, the method comprising:
   performed using one or more computer systems for;
   storing a first order and a pre-defined relative indication that corresponds to a willingness to either buy or sell a shares of financial product, the first order and the pre-defined relative indication each specifying single relative prices that are relative to a disseminated indicator of a prevailing current market price and each specifying single total share quantity values, with the existence of the pre-defined relative indication being undisclosed;
   receiving a second order specifying a relative price that is relative to a current market price and quantity;
   determining which of at least a first one of the first order and the pre-defined relative indication has a relative price that satisfies the relative price of the second order; and
   matching the determined one of the first order and the pre-defined relative indication to the second order to satisfy the second order.

53. The method of claim 52 wherein at least one of the first order and the second order is entered by a party acting as agent on behalf of a buyer or seller.

54. The method of claim 52 wherein the pre-defined relative indication originates from a party acting as agent on behalf of a buyer or seller.

55. The method of claim 52 wherein at least one of the first order and the second order is entered by a principal, with the at least one of the first order and the second order being selected from inventory held by the principal.

56. The method of claim 52 wherein the pre-defined relative indication originates from a principal acting for its own account.

57. The method of claim 52, wherein at least one of the first order and the second order is entered by a principal acting as a riskless principal.

58. The method of claim 52, wherein the pre-defined relative indication originates from a riskless principal.

59. The method of claim 52 wherein an originator of the pre-defined relative indication is undisclosed.

60. The method of claim 52 storing the pre-defined relative indication after determining that the pre-defined relative indication does not satisfy the second order.

61. The method of claim 52 wherein if determining determines that the first order does not satisfy the second order,
   determining whether the first order has an exposure time; and
   maintaining the first order if the first order does not have an exposure time, to allow the first order to match against future orders.

62. A computer program product tangibly embodied on a computer readable medium, the computer program product for trading shares in a financial product on a trading system and comprising executable instructions for causing a computer to:

store received pre-defined relative indications to buy or sell shares of a financial product, the pre-defined relative indications specifying a single price that is relative to a disseminated indicator of a prevailing current market price and specifying a single total share quantity value, with the existence of the pre-defined relative indications being undisclosed to trading entities in the trading system;

receive an order specifying a price and a quantity;

retrieve the stored pre-defined relative indications;

match a first one of the stored pre-defined relative indications that has a relative price that satisfies the price of the received order at a midpoint price of the current market price which is a price that is midpoint of the current market price for buying the shares of the financial product and the current market price selling the shares of the financial product.

63. The computer program product of claim 62 wherein instructions to match further comprise instructions to:

immediately execute the order against the pre-defined relative indication in accordance with a time associated with the pre-defined relative indication.

64. The computer program product of claim 62 wherein instructions to match further comprise instructions to:

collect all pre-defined relative indications; and execute the received order against an optimal one or more of the pre-defined relative indications determined in accordance with price and time.

65. The computer program product of claim 62 wherein instructions to match further comprise instructions to:

store the order to match against future orders if the relative price of the pre-defined relative indication does not satisfy the price of the order.

66. The computer program product of claim 62 wherein the single prices of at least some of the stored predefined relative indications comprise a first price component based on the disseminated indicator of a prevailing current market price and a second price component that corresponds to a price improvement value to be offered to incoming orders.

67. The computer program product of claim 62 wherein the orders fixed priced orders.

68. The computer program product of claim 62 wherein the orders are market priced orders.

69. The computer program product of claim 62 wherein the orders are conditioned orders that specify a minimum price improvement.

70. The computer program product of claim 62 wherein the order is a public agency order type.

71. The computer program product of claim 62 wherein the order type is a professional order type.

* * * * *